United States Patent [19]

Kawai et al.

[11] Patent Number: 5,070,181

[45] Date of Patent: * Dec. 3, 1991

[54] POLYIMIDE FILM

[75] Inventors: Hideki Kawai; Kiyokazu Akahori, both of Kobe; Hirosaku Nagano, Ootsu, all of Japan

[73] Assignee: Kanegafuchi Chemical Ind. Co., Ltd., Osaka, Japan

[*] Notice: The portion of the term of this patent subsequent to Dec. 12, 2006 has been disclaimed.

[21] Appl. No.: 391,700

[22] Filed: Aug. 7, 1989

Related U.S. Application Data

[63] Continuation of Ser. No. 164,041, Mar. 4, 1988, abandoned.

[30] Foreign Application Priority Data

Mar. 9, 1987 [JP] Japan .................................. 62-53592

[51] Int. Cl.$^5$ ......................... C08G 69/26; C08G 8/02; C08G 75/00
[52] U.S. Cl. .................................... 528/353; 528/126; 528/128; 528/173; 528/179; 528/185; 528/188; 528/351; 528/352; 428/473.5
[58] Field of Search ................ 528/353, 128, 126, 173, 528/179, 185, 188, 351, 352; 428/473.5

[56] References Cited

U.S. PATENT DOCUMENTS

| | | | |
|---|---|---|---|
| 4,063,984 | 12/1977 | Critchley | 528/353 |
| 4,255,313 | 3/1981 | Antonoplos | 528/128 |
| 4,299,750 | 11/1981 | Antonoplos | 528/128 |
| 4,316,844 | 2/1982 | Waitkus et al. | 528/185 |
| 4,378,400 | 3/1983 | Makino et al. | 428/220 |
| 4,405,770 | 9/1983 | Schoenberg | 526/259 |
| 4,673,612 | 6/1987 | Takagi et al. | 428/473.5 |
| 4,725,484 | 2/1988 | Kumagawa et al. | 528/353 |
| 4,837,299 | 6/1989 | Peters et al. | 528/353 |
| 4,886,874 | 12/1989 | Nagano et al. | 528/353 |

FOREIGN PATENT DOCUMENTS

| | | |
|---|---|---|
| 0023406 | 2/1981 | European Pat. Off. . |
| 61-158025 | 9/1986 | Japan . |
| 61-264028 | 11/1986 | Japan . |
| 982914 | 2/1965 | United Kingdom . |
| 1216505 | 12/1970 | United Kingdom . |

OTHER PUBLICATIONS

Yang et al., Journal of Applied Polymer Science, vol. 31, pp. 979-995 (1986), "Synthesis and Properties of Copolypyromellitimides".

*Primary Examiner*—John Kight, III
*Assistant Examiner*—P. Hampton-Hightower
*Attorney, Agent, or Firm*—Armstrong, Nikaido, Marmelstein, Kubovcik & Murray

[57] ABSTRACT

Disclosed is a film of polyimide having repeating units of formula (1) and a birefringence ($\Delta n$) of at least 0.13:

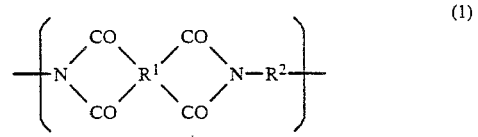

(1)

wherein $R^1$ is an aromatic group having a valency of 4, at carbon atoms constituting the aromatic ring, and $R^2$ is an aromatic group having a valency of 2, at carbon atoms constituting the aromatic ring. This polyimide film exhibits good thermal dimensional stability.

2 Claims, No Drawings

POLYIMIDE FILM

This application is a continuation of application Ser. No. 164,041 filed Mar. 4, 1988, abandoned.

BACKGROUND OF THE INVENTION

1. Field of the Invention

The present invention relates to a polyimide resin, widely known as a heat resistant resin, and more particularly, to a polyimide film having improved thermal dimensional stability

2. Description of the Related Art

It is known that polyimide resins exhibit excellent properties such as a high resistance to heat and chemicals, as well as having good electrical and mechanical characteristics. A polyimide film formed of a polyimide resin synthesized from 4,4'-diaminodiphenyl ether and pyromellitic dianhydride has been used in a wide variety of applications, such as is described in, for example, Japanese Patent Publication (Kokoku) No. 36-10999. Polyimide film, which exhibits excellent mechanical characteristics, such as in relation to elongation, has a high coefficient of expansion and thus poor thermal dimensional stability. In recent times, there has been a sharp increase in demand, especially on the part of the electronic and electrical industries, for a polyimide film having excellent dimensional stability and mechanical characteristics. This is because such a film would be extremely useful for printed circuit boards requiring fine processing, as well as in other fields, such as high density magnetic recording. For this reason, various studies are currently being made in an attempt to develop a polyimide film having excellent dimensional stability. For example, the use of rigid molecules such as paraphenylenediamine, dimethyl benzidine, and pyromellitic dianhydride for improving thermal dimensional stability is exemplified in Japanese Patent Disclosures (Kokai) Nos. 61-264028; 61-241325; 61-181828; 61-158025; and 58-185624. However, all of the resultant polyimide films leave room for further improvement with respect to their mechanical strength (particularly, elongation) and their resistance to heat and chemicals.

SUMMARY OF THE INVENTION

The object of the present invention is to provide a polyimide film of excellent characteristics, including high thermal dimensional stability and high mechanical strength, particularly with regard to elongation.

As a result of extensive research carried out with the aim of solving the problems described above, the present inventors have found that a film of polyimide having repeating units of formula (1) and a birefringence ($\Delta n$) of at least 0.13 exhibits a low coefficient of linear expansion, and thus excellent thermal dimensional stability:

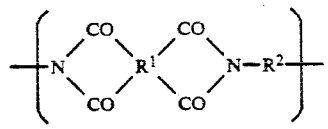

(1)

wherein $R^1$ is an aromatic group having a valency of 4, at carbon atoms constituting the aromatic ring, and $R^2$ is an aromatic group having a valency of 2, at carbon atoms constituting the aromatic ring.

The way in which to measure the birefringence ($\Delta n$) is described in, for example, "Shin Jikken Kagaku Koza, Vol. 19 (Maruzen Ltd.)" and "Seni-Kobunshi Sokuteiho no Gijutsu (Asakura Shoten)". To be brief, a sample is cut into a wedge shape. Interference fringes can be seen if the sample is subjected to polarizing microscopic observation using sodium light. The birefringence ($\Delta n$) of the sample, in which n represents the number of interference fringes, is determined as follows:

$$\Delta n = (n \times \lambda)/d$$

where, $\lambda$ is the wavelength (589 nm) of the sodium light, and d is the sample width (nm).

DETAILED DESCRIPTION OF THE PREFERRED EMBODIMENTS

A film of polyimide having a birefringence ($\Delta n$) of at least 0.13 exhibits good thermal dimensional stability. The thermal dimensional stability of the film is much improved if the birefringence value is 0.17 or greater, and preferably, 0.18 or more. If the birefringence is less than 0.13, the polyimide film exhibits a high coefficient of linear expansion, which results in poor thermal dimensional stability.

The polyimide forming the film of the present invention has repeating units represented by formula (1). It is possible for two or more different repeating units to be present in the polyimide as long as the repeating units can be represented by formula (1). It is also possible for a small amount of repeating units differing from those represented by formula (1) to be present in the polyimide as long as the object and effect of the present invention can be achieved. $R^1$ in formula (1), i.e., the aromatic group having a valency of 4, at carbon atoms constituting the aromatic ring, includes, for example,

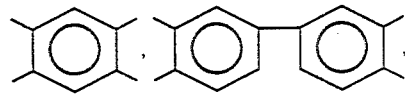

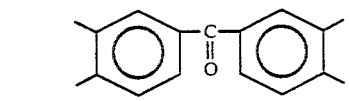

It is preferably to use

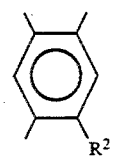

in view of, for example, its greater availability, $R^2$ in formula (1), i.e., the aromatic group having a valency of 2, at carbon atoms constituting the aromatic ring, includes, for example,

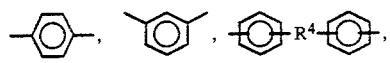

-continued

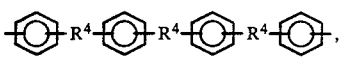

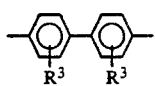

where, $R^4$ is a divalent organic group, and $R^3$ is a monovalent organic group. $R^4$ includes, for example, —O—, —S—, —SO$_2$—, —CH$_2$—, —C(CH$_3$)$_2$—, and —C(CF$_3$)$_2$—. On the other hand, $R^3$ includes, for example, —CH$_3$, —OCH$_3$, —OH, and —COOH.

The repeating unit of formula (2) or (3) given below is preferable for achieving the effect of the present invention:

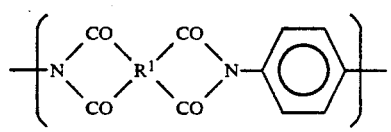

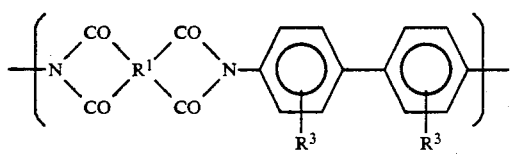

However, it is more preferable to use the repeating units of formula (4), given below, in combination with the repeating units of formula (2):

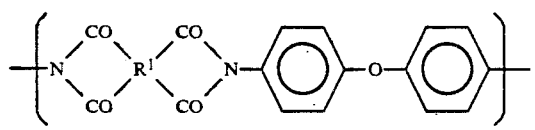

In formulas (2) to (4), $R^1$ is as defined previously. As an alternative, the repeating units of formulas (3) and (4) may be used in combination. The molar ratio of the repeating units of formula (4) to the repeating units of formula (2) or of the repeating units of formula (4) to the repeating units of formula (3) should preferably fall within the range of between 1:99 and 90:10. If the molar ratio is greater than 90:10, the effect this has on increasing the birefringence (Δn) is relatively small.

In manufacturing the polyimide film of the present invention, the polyimide is prepared first from a polyamic acid solution which is a precursor to the polyimide. The polyamic acid solution can be prepared by a known method. Specifically, the polyamic acid solution can be prepared by polymerizing substantially equimolar amounts of an acid anhydride component and a diamine component in an organic polar solvent. When it comes to a polyamic acid solution having two or more different repeating units, it is possible to employ any copolymerization method. Further, it is possible to mix different polyamic acid solutions.

The polyimide can be prepared from the polyamic acid solution by way of a chemical method in which a dehydrating agent in an amount exceeding the stoichiometric amount and, as required, a catalytic amount of a tertiary amine, etc, are added to the polyamic acid solution for achieving the desired dehydration. Alternatively, the ring-closing to provide the desired polyimide can be performed thermally without using a dehydrating agent. The chemical method is far superior to the thermal method for providing the desired polyimide having a birefringence (Δn) of at least 0.13, though the reason for this is as yet unknown.

For manufacturing a polyimide film, the polyamic acid solution is cast or coated on a support, to form a film. The film is dried at 150° C. or less for 1 to 30 minutes to obtain a self-supporting film. After it is peeled off the support, the film is fixed to a stationary frame and gradually heated to 100° to 500° C., so as to thermally or chemically perform dehydration and ring-closing to provide the required polyimide film. Alternatively, the polyamic acid solution cast or coated on a support may be gradually heated to about 100° to 500° C. for thermally or chemically performing the dehydration and ring-closing on the support. In order to obtain a polyimide film having a birefringence of at least 0.13, however, it is preferable to peel off the self-supporting film, as in the former method, though again, the reason for this is unknown. When chemical dehydration is employed in the former method, the required polyimide film can be obtained very easily.

Substances suitable as the dehydrating agent used in the method of chemical dehydration and ring-closing can include, for example, a fatty acid anhydride and an aromatic acid anhydride, while those suitable as the catalyst can include, for example, an aliphatic tertiary amine such as triethyl amine, an aromatic tertiary amine such as dimethylaniline, and a heterocyclic tertiary amine such as pyridine, picoline, or isoquinoline.

EXAMPLES

The present invention can be more fully understood when taken in conjunction with the Examples which follow, though it should be understood that the present invention is not restricted to these Examples.

The linear expansion coefficient, in each case, was measured under the condition of 5° C./min, using a TMA-10 (trademark of a thermophysical tester manufactured by Seiko Electronics Inc.), and is given by the average value within the range of between 100° C. and 200° C.

COMPARATIVE EXAMPLE 1

26.78 g of paraphenylenediamine was placed in a 500-ml four-neck flask, and 245.00 g of N,N-dimethyl acetoamide was added thereto to dissolve the paraphenylenediamine. In addition, 18.22 g of 3,3',4,4'-biphenyltetracarboxylic acid anhydride in a solid state was placed in a 100-ml eggplant type flask and then added to the paraphenylenediamine solution. The 3,3',4,4'-biphenyltetracarboxylic acid dianhydride remaining attached to the inner surface of the eggplant type flask was dissolved in 10.00 g of N,N-dimethyl acetoamide, and the resultant solution was poured into the four-neck flask. The mixture was kept stirred for 3 hours to obtain 15% by weight of a polyamic acid solution. In the above reactions, dry nitrogen gas was used to treat the 3,3',4,4'-biphenyltetracarboxylic acid dianhydride and to fill the reaction system.

The polyamic acid solution thus prepared was cast and coated on a glass plate and dried at 100° C. for 10 minutes, to form a film. The polyamic acid film was then peeled off from the glass plate and fixed to a stationary frame. Thereafter, the film was heated at 100° C. for about 30 minutes, at about 200° C. for about 60 minutes and, finally, at about 300° C. for about 60 minutes, so as to perform dehydration and ring-closing and, thus, to obtain a polyimide film about 25 microns thick. Table 1 shows the properties of the polyimide film obtained.

COMPARATIVE EXAMPLE 2

Acetic anhydride and isoquinoline were added to a polyamic acid solution prepared as in Comparative Example 1, in amounts of 4 moles and 0.5 mole, respectively, relative to 1 mole of the amide bond of the polyamic acid solution. The mixture was well stirred and then cast and coated on a glass plate, after which it was heated at about 100° C. for about 10 minutes, at about 250° C. for about 10 minutes and, finally, at about 350° C. for about 5 minutes. After the heating, the coating was peeled off from the glass plate so as to obtain a polyimide film about 25 microns thick. Table 1 shows the properties of the polyimide film obtained.

COMPARATIVE EXAMPLE 3

A polyamic acid solution was prepared as in Comparative Example 1, except that 21.54 g of 4,4'-diaminodiphenyl ether and 23.46 g of pyromellitic anhydride were used. Added to the solution were 4 moles of acetic anhydride and 0.5 mole of isoquinoline relative to 1 mole of the amide bond of the polyamic acid. The mixture was well stirred and, then, cast and coated on a glass plate, after which the coating was dried at about 100° C. for about 10 minutes. After the drying, the polyamic acid film was peeled off from the glass plate and fixed to a stationary frame. In this condition, the film was heated at about 250° C. for about 10 minutes and, then, at about 350° C. for about 5 minutes, so as to obtain a polyimide film about 25 microns thick. Table 1 shows the properties of the polyimide film obtained.

EXAMPLE 1

A polyimide film about 25 microns thick was prepared as in Comparative Example 3, using a polyamic acid solution prepared as in Comparative Example 1. Table 1 shows the properties of the polyimide film obtained.

EXAMPLE 2

A polyimide film about 25 microns thick was prepared as in Comparative Example 3, except that equimolar amounts of 3,3'-dimethyl-4,4'-diamino biphenyl and 4,4'-diaminodiphenyl ether were used together with an equimolar amount of pyromellitic anhydride. Table 1 shows the properties of the polyimide film obtained.

EXAMPLES 3-6

Polyimide films each about 25 microns thick were prepared as in Comparative Example 3, except that the molar ratio of 4,4'-diaminodiphenyl ether to paraphenylene diamine was changed and an equimolar amount of pyromellitic anhydride was used together therewith. Table 1 shows the properties of the polyimide films obtained.

TABLE 1

| | Acid anhydride component | Diamine component | A* ($\Delta d$) | B* |
|---|---|---|---|---|
| Comparative Example 1 | 3,3',4,4'-biphenyl tetracarboxylic dianhydride | paraphenylene diamine | 0.12 | $2.3 \times 10^{-5}$ |
| Comparative Example 2 | 3,3',4,4'-biphenyl tetracarboxylic dianhydride | paraphenylene diamine | 0.11 | $2.0 \times 10^{-5}$ |
| Comparative Example 3 | pyromellitic anhydride | 4,4-diaminodiphenyl ether | 0.11 | $2.5 \times 10^{-5}$ |
| Example 1 | 3,3',4,4'-biphenyl tetracarboxylic dianhydride | paraphenylene diamine | 0.18 | $0.1 \times 10^{-5}$ |
| Example 2 | pyromellitic anhydride | X*:Y* = 50:50 (molar ratio) | 0.20 | $0.1 \times 10^{-5}$ |
| Example 3 | pyromellitic anhydride | Z*:Y* = 20:80 (molar ratio) | 0.16 | $1.2 \times 10^{-5}$ |
| Example 4 | pyromellitic anhydride | Z*:Y* = 50:50 (molar ratio) | 0.19 | $0.7 \times 10^{-5}$ |
| Example 5 | pyromellitic anhydride | Z*:Y* = 80:20 (molar ratio) | 0.21 | $0.2 \times 10^{-5}$ |
| Example 6 | pyromellitic anhydride | Z*:Y* = 10:90 (molar ratio) | 0.13 | $1.5 \times 10^{-5}$ |

Note (*):
A: Birefringence
B: Linear expansion coefficient (°C.$^{-1}$, (100 to 200° C.))
X: 3,3'-dimethyl-4,4'-diamino biphenyl
Y: 4,4'-diaminodiphenyl ether
Z: paraphenylene diamine As is apparent from Table 1, the polyimide film exhibits a small linear expansion coefficient if its birefringence ($\Delta n$) is 0.13 or greater.

What is claimed is:

1. A film of a polyimide consisting essentially of repeating units of formula (2) and repeating units of formula (4)

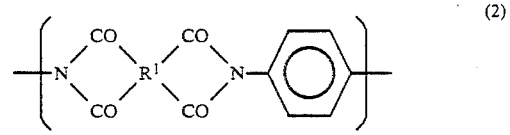

(2)

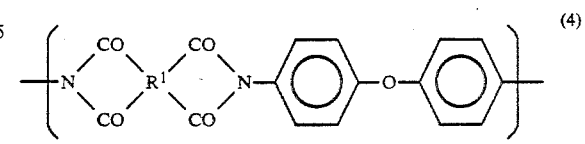

(4)

wherein $R^1$ is

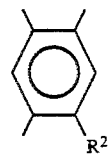

and the birefringence ($\Delta n$) of said film is at least 0.13.

2. A film of a polyimide according to claim 1, wherein the molar ratio of the repeating unit of formula (4) to the repeating unit of formula (2) is in the range 1:99 to 90:10.

* * * * *

UNITED STATES PATENT AND TRADEMARK OFFICE
CERTIFICATE OF CORRECTION

PATENT NO. : 5,070,181
DATED : Dec. 3, 1991
INVENTOR(S) : Kawai et al

It is certified that error appears in the above-identified patent and that said Letters Patent is hereby corrected as shown below:

Column 2, between lines 50-57, delete " 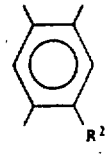 " and substitute therefor -- 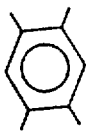 --.

Column 6, between lines 51-60, delete " 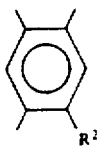 " and substitute therefor --  --.

Signed and Sealed this

Twenty-fifth Day of May, 1993

Attest:

MICHAEL K. KIRK

Attesting Officer

Acting Commissioner of Patents and Trademarks